(12) United States Patent
Hirabayashi (10) Patent No.: US 10,559,997 B2
(45) Date of Patent: Feb. 11, 2020

(54) BRUSH DEVICE, ELECTRIC MOTOR WITH BRUSH DEVICE, AND MANUFACTURING METHOD OF BRUSH DEVICE

(71) Applicant: DENSO CORPORATION, Kariya, Aichi-pref. (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/205,739

(22) Filed: Nov. 30, 2018

(65) Prior Publication Data

US 2019/0097487 A1 Mar. 28, 2019

Related U.S. Application Data

(62) Division of application No. 15/062,464, filed on Mar. 7, 2016, now Pat. No. 10,177,623.

(30) Foreign Application Priority Data

Mar. 13, 2015 (JP) ................. 2015-050500

(51) Int. Cl.
*H01R 39/38* (2006.01)
*H02K 5/14* (2006.01)

(52) U.S. Cl.
CPC ........... *H02K 5/148* (2013.01); *H01R 39/385* (2013.01)

(58) Field of Classification Search
CPC ....... H02K 5/148; H01R 39/385; H01R 39/38
See application file for complete search history.

(56) References Cited

U.S. PATENT DOCUMENTS

| 7,256,527 | B2 | 8/2007 | Niimi |
| 8,427,027 | B2* | 4/2013 | Grabner ............... H01R 39/383 |
| | | | 310/239 |
| 9,985,401 | B2 | 5/2018 | Hirabayashi |
| 10,177,623 | B2* | 1/2019 | Hirabayashi ........... H02K 5/148 |
| 2008/0083556 | A1 | 4/2008 | Sumcad et al. |
| 2011/0025063 | A1 | 2/2011 | Faber et al. |
| 2011/0187225 | A1 | 8/2011 | Bayer et al. |
| 2016/0268865 | A1 | 9/2016 | Hirabayashi |

FOREIGN PATENT DOCUMENTS

| CN | 101752961 A | 6/2010 |
| JP | H10-243592 A | 9/1998 |
| KR | 2013-0007793 A | 1/2013 |

OTHER PUBLICATIONS

Jun. 15, 2018 Office Action issued in U.S. Appl. No. 15/062,464.
Sep. 6, 2018 Notice of Allowance issued in U.S. Appl. No. 15/062,464.

* cited by examiner

*Primary Examiner* — Dang D Le
(74) *Attorney, Agent, or Firm* — Oliff PLC

(57) ABSTRACT

In order to facilitate the assembly of the brush assembly and to improve the productivity, the brush device includes a positive side brush subassembly having a positive side brush for feeding a commutator, a positive side brush holder for holding the positive side brush, and a positive side plate to which the positive side brush holder is attached, and a negative side brush subassembly having a negative side brush for feeding the commutator, a negative side brush holder for holding the negative side brush, and a negative side plate to which the negative side brush holder is attached. The positive side brush subassembly and the negative side brush subassembly are combined with each other.

5 Claims, 12 Drawing Sheets

FIG.1

BRUSH ASSY

BRUSH ASSY

BRUSH DEVICE, ELECTRIC MOTOR WITH BRUSH DEVICE, AND MANUFACTURING METHOD OF BRUSH DEVICE

CROSS-REFERENCE TO RELATED APPLICATION

This application is a divisional application based on U.S. patent application Ser. No. 15/062,464 filed Mar. 7, 2016.

TECHNICAL FIELD

The present disclosure relates to a brush device, an electric motor with the brush device, and a manufacturing method of the brush device.

BACKGROUND

As conventional technology, there is a brush assembly applied to a six-pole magnet type DC motor disclosed in Korean Patent Application PCT/KR2013/007793.

The brush assembly is provided with brushes (three positive brushes and three negative brushes, for example) disposed on an outer periphery of a cylindrical commutator, and a box-shaped brush holder that holds the brushes.

The brush assembly is further provided with brush springs accommodated inside the brush holder to press the brushes to the commutator, positive connection plates for electrically connecting between the positive brushes, and negative connection plates for electrically connecting between the negative brushes.

The brush holder is disposed between the positive connection plates and the negative connection plates, and is assembled to both the connection plates from an inner peripheral side in a radial direction.

Methods of assembling the brush assembly according to the conventional technology (PCT/KR2013/007793) are considered to be according to the following two patterns.

1) In a state where the positive connection plates, all of the brush holders, and the negative connection plates are assembled, the brush springs and the brushes are inserted into the brush holder in this order from inside in a radial direction thereof.

Thereafter, a jig is inserted into a central portion of the brush holder so that the brushes do not drop out toward the inner peripheral side.

2) In a state where the positive connection plates and all of the brush holders are assembled, the brush springs and the brushes are inserted into the brush holder in this order from inside in a radial direction thereof.

Thereafter, in a state where a jig is inserted into a central portion of the brush holder so that the brushes do not drop out toward the inner peripheral side, all of the brush holders are fixed to the negative connection plates.

Since the brushes are inserted into the brush holder in a state of where at least all of the brush holders are assembled to the positive connection plates in the above assembling method, it is impossible to insert all the brushes to each brush holder from the inside in the radial direction simultaneously.

Moreover, when inserting all of the brushes into the brush holders one by one, it is necessary to press the brushes that have been inserted into the brush holders so that the brushes do not drop out toward the inner peripheral side.

Therefore, in the configuration of PCT/KR2013/007793, since assemblability of the brush assembly is poor and assembling work takes time, there is a problem that the productivity is low.

SUMMARY

An embodiment provides a brush device, an electric motor with the brush device, and a manufacturing method of the brush device for assembling a brush assembly easily, and improving productivity.

According to a first aspect of the disclosure, a brush device includes a positive side brush sub-assembly having a positive side brush for feeding a commutator, a positive side brush holder for holding the positive side brush, and a positive side plate to which the positive side brush holder is attached, and a negative side brush sub-assembly having a negative side brush for feeding the commutator, a negative side brush holder for holding the negative side brush, and a negative side plate to which the negative side brush holder is attached.

The positive side brush sub-assembly and the negative side brush sub-assembly are combined with each other.

According to the above configuration, an assembling space per brush can be increased, thus assembling becomes easy, and productivity can be improved.

According to a second aspect of the disclosure, the brush device of the first aspect further includes the positive side brush holder has a positive convex portion engaging with the negative side plate, the negative side brush holder has a negative convex portion engaging with the positive side plate, the positive side plate has a positive slit engaging with the negative convex portion, and the negative side plate has a negative slit engaging with the positive convex portion.

Then, the positive side brush sub-assembly and the negative side brush sub-assembly are combined with each other by the positive convex portion and the negative slit being engaged and the negative convex portion and the positive slit being engaged.

According to the above configuration, by combining the convex portion and the slit, it is possible to easily combine the positive side brush sub-assembly and the negative side brush sub-assembly.

DETAILED DESCRIPTION OF THE PREFERRED EMBODIMENTS

Modes for carrying out the present disclosure will be described in more detail by the following embodiments.

EMBODIMENTS

First Embodiment

In a first embodiment, a case of using a DC motor of the present disclosure to a starter for starting an engine will be described.

Figure 4:
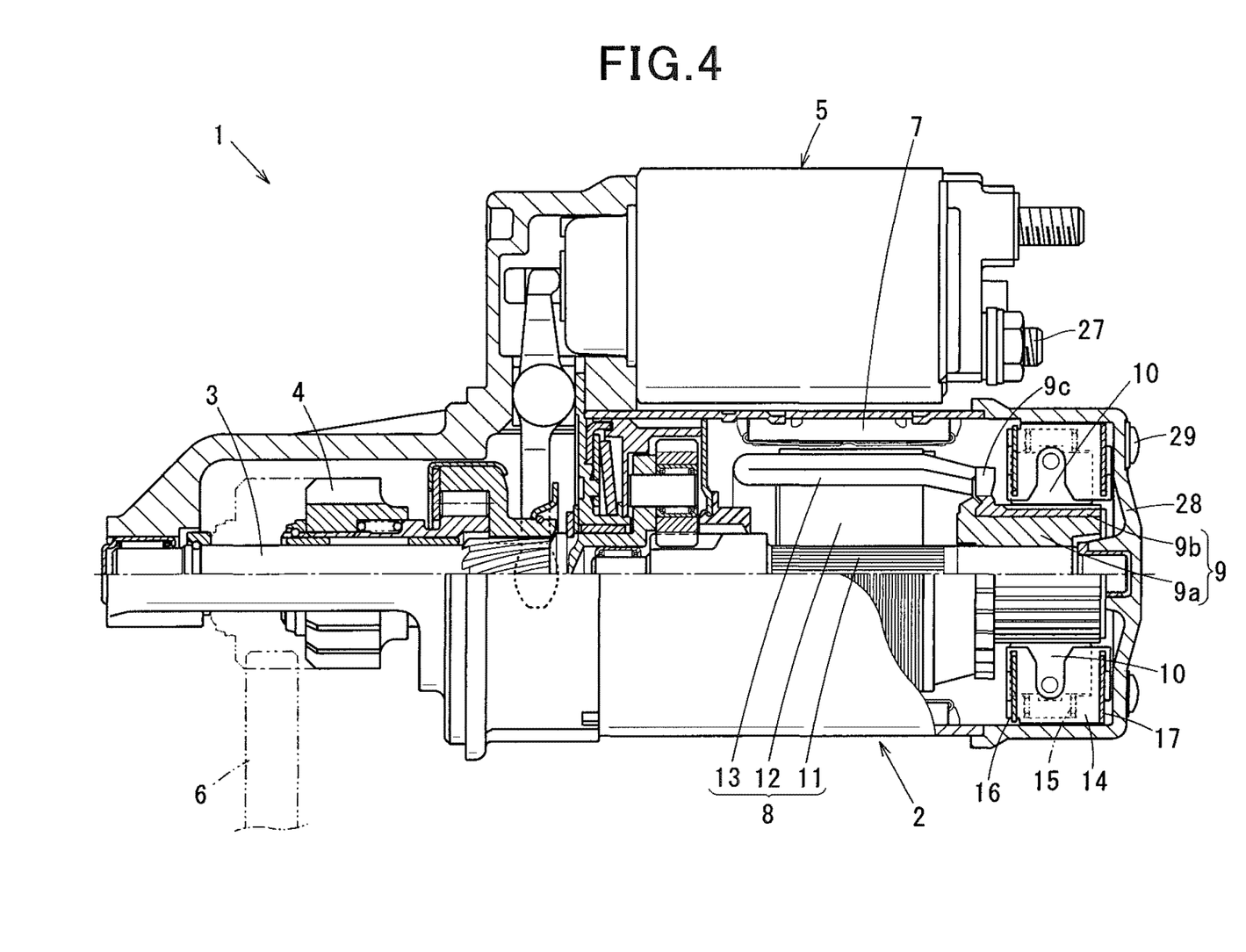
FIG. 4 shows a partially sectional overall view of a starter according to the first embodiment.

As shown in FIG. 4, a starter 1 has a pinion 4 disposed on an output shaft 3 that is driven and rotated by a motor 2.

The starter 1 employs a system that engages the pinion 4 with a ring gear 6 of an engine (not shown) by pushing out the pinion 4 in a counter-motor direction of the output shaft 3 (to the left in FIG. 4) using an attraction force of an electromagnetic switch 5 that integrates a solenoid therein (generally called a pinion-plunging type).

It should be noted that since the basic structure and operation of the starter 1 are well known, detailed description is omitted, and the motor 2 in detail according to the present disclosure will be described below.

The motor 2 is a DC motor of four or more poles (e.g. 6 poles) that uses a permanent magnet 7 for a field pole, and includes an armature 8, a cylindrical commutator 9, brushes 10, and the like. The armature 8 is disposed on an inner periphery of the field pole with an air gap therebetween. The commutator 9 is composed on an axis of the armature 8. The brushes 10 are disposed on an outer periphery of the commutator 9.

The commutator 9 includes a cylindrical insulator base 9a made of a resin material, for example, and a plurality of commutator segments 9b disposed in a cylindrical shape and held by the insulator base 9a.

Then, the insulator base 9a is fixed by press-fitting to an outer circumference of one end of an armature shaft 11.

Each of the commutator segments 9b is insulated from each other by the insulator base 9a, and an armature coil 13 is connected to a riser 9c provided on each commutator segments 9b in an armature core 12 side in an axial direction (left side in FIG. 4).

The brushes 10 include three positive brushes 10a and three negative brushes 10b disposed alternately in a circumferential direction of the commutator 9, and constitute a brush assembly shown in FIG. 1 together with brush holders 14, brush pressing members 15, and a pair of connection plates 16, 17 described below.

Figure 3:
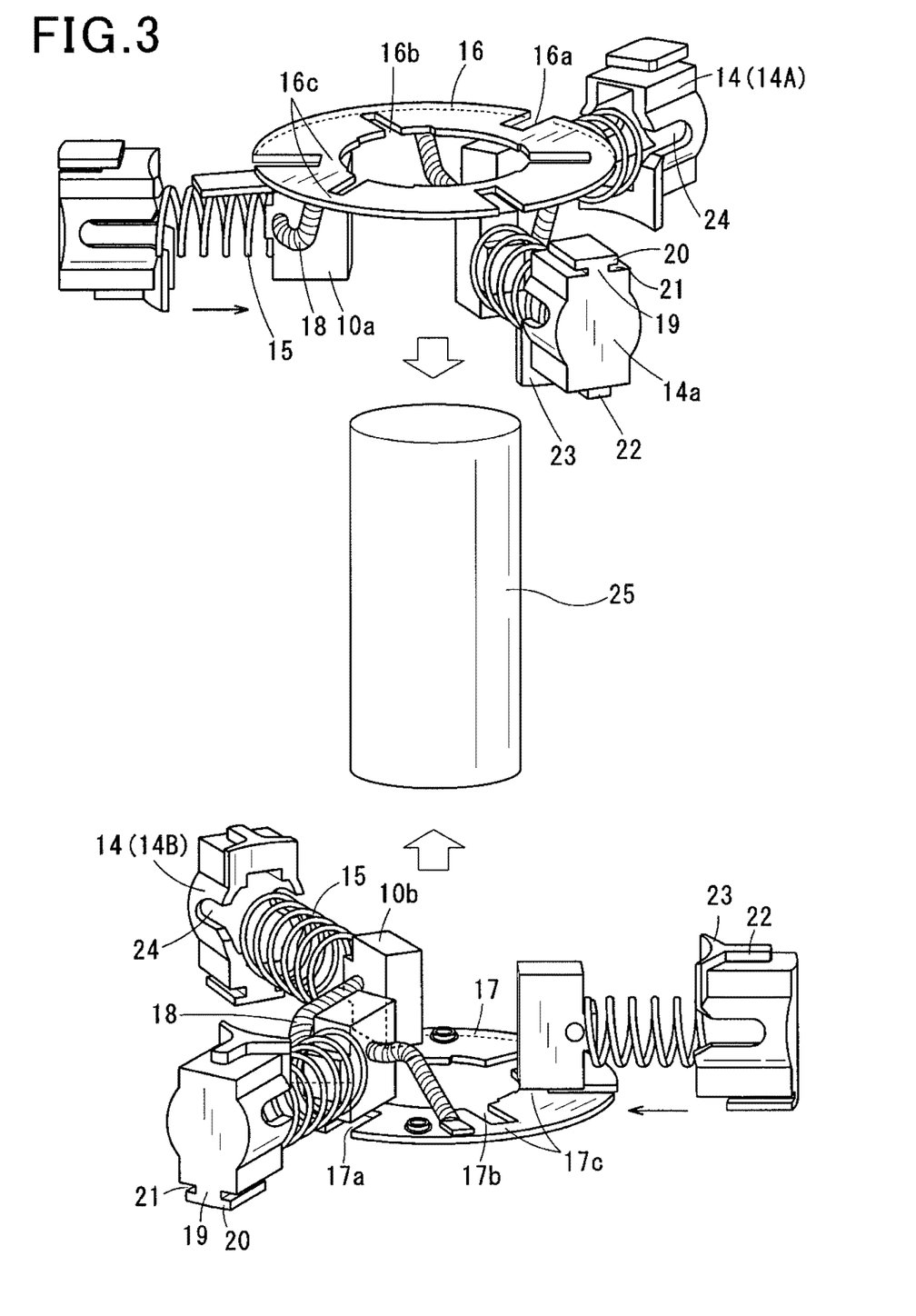
FIG. 3 shows a perspective view of a core-side sub ASSY and a counter-core-side sub ASSY in a state before assembling according to the first embodiment.

Each of the brush holders 14 is formed of insulating member such as a resin or the like, and as shown in FIG. 3, an inner peripheral side of the brush holder 14 in a radial direction is opened to form a box-shape having a wall 14a on an outer peripheral side in the radial direction.

The brush pressing member 15 is a coil spring, for example, and is accommodated in the brush holder 14. A position of the brush pressing member 15 outside in the radial direction is regulated by the wall 14a of the brush holder 14, and presses the brush 10 toward the commutator 9.

Both of the pair of connection plates 16, 17 are made of metal, and each has a ring-shape that has a round hole having a larger diameter than an outer diameter of the commutator 9 opened in a central portion in the radial direction of the connection plates 16, 17.

The pair of connection plates 16 and 17 include a core-side connection plate 16 (corresponds to a first connection plate in the present disclosure) disposed on a core side in an axial direction, and a counter-core-side connection plate 17 (corresponds to a second connection plates of the present disclosure) disposed on a counter-core side in the axial direction.

Incidentally, the core side in the axial direction refers to a side close to the armature core 12 (left side in FIG. 4), and the counter-core-side in the axial direction refers to a side further from the armature core 12 (right side in FIG. 4).

As shown in FIG. 3, the three positive brushes 10a are respectively connected electrically to a counter-core-side surface of the core-side connection plate 16 facing the counter-core-side connection plate 17 in the axial direction through pigtails 18.

On the other hand, the three negative brushes 10b are respectively connected electrically to a core-side surface of the counter-core-side connection plate 17 facing the core-side connection plate 16 in the axial direction through the pigtails 18.

Further, first slits 16a are formed on the core-side connection plate 16 in peripheral positions where the brush holders 14 that hold the positive brushes 10a are disposed, and second slits 16b (positive slits) are formed in peripheral positions where the brush holders 14 that hold the negative brushes 10b are disposed.

First slits 17a are formed on the counter-core-side connection plate 17 in peripheral positions where the brush holders 14 that hold the negative brushes 10b are disposed, and second slits 17b (negative slits) are formed in peripheral positions where the brush holders 14 that hold the positive brushes 10a are disposed.

Hereinafter, the brush holders 14 that hold the positive brushes 10a are referred to as first brush holders 14A (positive side brush holders), and the brush holders 14 that hold the negative brushes 10b are referred to as second brush holders 14B (negative side brush holders).

Note that common functions and shapes between the first brush holders 14A and the second brush holders 14B will be described by assigning the same reference numerals.

The first slits 16a, 17a formed in the core-side connection plate 16 and the counter-core side plates 17 are open to the outside in the radial direction and extend a halfway to the inside of the plates in the radial direction.

On the other hand, the second slits 16b, 17b are open to the inside in the radial direction and extend a halfway to the outside of the plates in the radial direction.

In other words, the core-side connection plate 16 and the counter-core-side connection plate 17 have flat plate portions between the first slits 16a, 17a and the second slits 16b, 17b, in the circumferential direction, and bridge portions 16c, 17c that connect flat plate portions adjacent to each other in the circumferential direction are formed inside of the first slits 16a, 17a in the radial direction and outside of the second slits 16b, 17b in the radial direction.

Incidentally, the pigtails 18 of the positive brushes 10a and the negative brushes 10b are connected to the flat plate portions of the core-side connection plate 16 and the flat plate portions of the counter-core-side connection plate 17, respectively.

The flat plate portions are provided between a plurality of slits 16a, 16b aligned in the circumferential direction of the core-side connection plate, that is, the positive side plate 16.

Positive side connecting flat plate portions connecting the pigtails 18 of the three positive side brushes 10a and positive side non-connecting flat plate portions not connecting the pigtails 18 are alternately disposed on the flat plate portions in the circumferential direction.

Further, the other flat plate portions are provided between a plurality of slits 17a, 17b aligned in the circumferential direction of the counter-core-side connection plate, that is, the negative side plate 17.

Negative side connecting flat plate portions connecting the pigtails 18 of the negative side brush 10b and negative side non-connecting flat plate portions not connecting the pigtails 18 are alternately disposed on the flat plate portions.

In the positive side brush sub-assembly and the negative side brush sub-assembly, the positive side connecting flat plate portions and the negative side non-connecting flat plate portions are assembled facing each other in the axial direction, and the positive side non-connecting flat plate portions and the negative side connecting flat plate portions are assembled facing each other in the axial direction.

A core-side attaching portion to the core-side connection plate 16 is disposed at a core side end of the first brush holder 14A, and a counter-core-side attaching portion to the counter-core-side connection plate 17 is disposed at a counter-core-side end of the first brush holder 14A.

The core-side attaching portion has a slit insertion portion 19 that is inserted into the first slit 16a of the core-side connection plate 16, and a supporting portion 20 formed on the core side of the slit insertion portion 19.

The slit insertion unit 19 is disposed protruding from a core-side end face of the first brush holder 14A, and has an axial height that is substantially the same as the thickness of the core-side connection plate 16.

The supporting portion 20 has a plate shape and is disposed extending in the circumferential direction from both sides in the circumferential direction of the slit insertion portion 19, and is formed so that a peripheral dimension thereof is greater than the peripheral width of the first slit 16a.

Further, in the core-side attaching portion, a pair of guiding grooves 21, of which sides of the slit insertion portion 19 in the circumferential direction as groove bottoms, are formed between the core-side end face of the first brush holder 14A that faces in the height direction (axial direction) of the slit insertion portion 19 and an inner surface of the supporting portion 20 (counter-core side surface).

Note that a first engagement surface and a second engagement surface as set forth in claim 7 of the present disclosure are the core-side end face of the first brush holder 14A and the inner surface of the supporting portion 20 that form the guiding grooves 21.

The counter-core-side attaching portion has a convex portion 22 that can be press-fit into the second slit 17b formed in the counter-core-side connection plate 17 and a radial direction regulating portion 23 disposed inside in the radial direction of the convex portion 22.

The radial direction regulating portion 23 is disposed so as to be curved in an arc shape extending in the circumferential direction from both sides of the convex portions 22, and has a function to regulate an outside position in the radial direction of the first brush holder 14A relative to the counter-core-side connection plate 17.

A counter-core-side attaching portion to the counter-core-side connection plate 17 is disposed at a counter-core-side end of the second brush holder 14B, and a core-side attaching portion to the core-side connection plate 16 is disposed at a core side end of the second brush holder 14B.

Functions and shapes of the counter-core-side attaching portion and the core-side attaching portion of the second brush holder 14B are the same as those of the first brush holder 14A, thus duplicating descriptions will be omitted.

Note that a first engagement surface and a second engagement surface as set forth in claim 8 of the present disclosure are the counter-core-side end face of the second brush holder 14B and the core side surface of the supporting portion 20 that form the guiding grooves 21.

U-shaped grooves 24 are formed on respective side surface in the circumferential direction of the first brush holders 14A and the second brush holders 14B for leading out the pigtails 18.

Next, assembling method of the brush assembly will be described.

Figure 2:
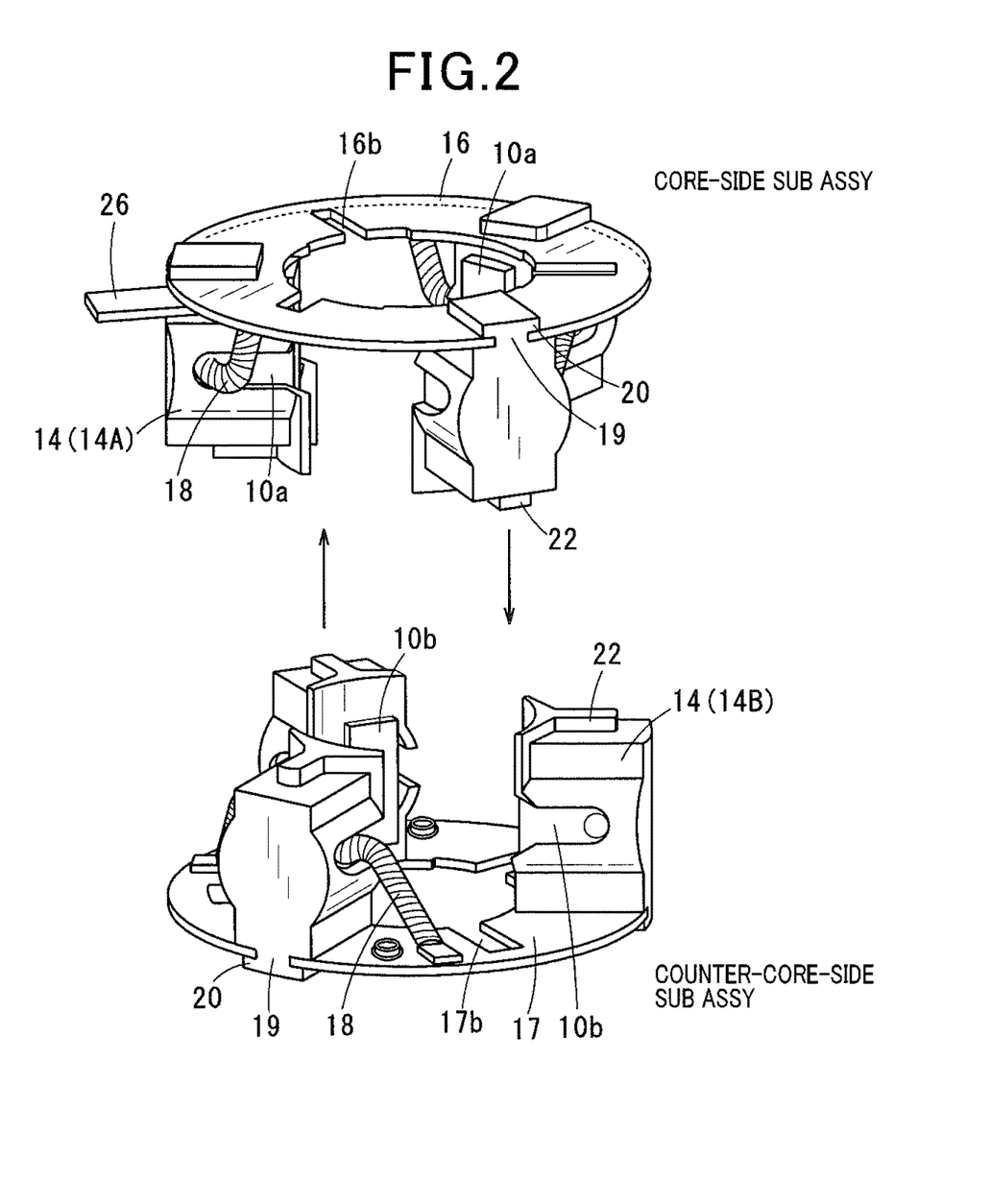
FIG. 2 shows a perspective view of the brush ASSY in a state before assembling according to the first embodiment.

As shown in FIG. 2, the brush assembly is constituted by combining a core-side sub-assembly and a counter-core-side sub-assembly. The core-side sub-assembly is configured by accommodating the three positive brushes 10a together with the brush pressing members 15 in the first brush holders 14A. The counter-core-side sub-assembly is configured by accommodating the three negative brushes 10b together with the brush pressing members 15 in the second brush holders 14B.

As shown in FIG. 3, the core-side sub-assembly and counter-core-side sub-assembly are assembled by placing a cylindrical jig 25, which regulates inside positions in the radial direction of the positive brushes 10a and the negative brushes 10b, in a central portion in the radial direction of the sub-assemblies.

The core-side sub-assembly is formed by inserting the slit insertion portions 19 of the first brush holders 14A into the first slits 16a from the outer peripheral side of the core-side connection plate 16.

The brush pressing members 15 and the positive brushes 10a are incorporated in the first brush holders 14A during the process of assembling the first brush holders 14A to the core-side connection plate 16.

The inside positions in the radial direction of the first brush holders 14A with respect to the core-side connection plate 16 are regulated by inside ends of the slit insertion portions 19 abutting against inside ends of the first slits 16a.

Further, when inserting the slit insertion portions 19 into the first slits 16a, both sides in the circumferential direction of the first slits 16a are inserted into the pairs of guiding grooves 21 formed on the core side attaching portions of the first brush holders 14A.

In other words, axial positions of the first brush holders 14A relative to the core-side connection plate 16 are regulated by the both sides in the circumferential direction of the first slits 16a being sandwiched between the core-side end faces of the first brush holders 14A that form the guiding grooves 21 and the inner surfaces of the supporting portions 20 (refer to FIG. 2).

Similar to the core-side sub-assembly, the second brush holders 14B are assembled to the counter-core-side connection plate 17 by inserting the slit insertion portions 19 provided in the second brush holders 14B into the first slits 17a from outside in the radial direction of the counter-core-side connection plate 17 in the counter-core-side sub-assembly.

Then, the brush assembly is constituted by combining the core-side sub-assembly and the counter-core-side sub-assembly.

In other words, the convex portions 22 provided on the counter-core side of the first brush holders 14A are press-fitted in the axial direction into the second slits 17b formed in the counter-core-side connection plate 17, and similarly, the convex portions 22 provided on the core side of the second brush holders 14B are press-fitted in the axial direction into the second slits 16b formed in the core-side connection plate 16.

Figure 1:
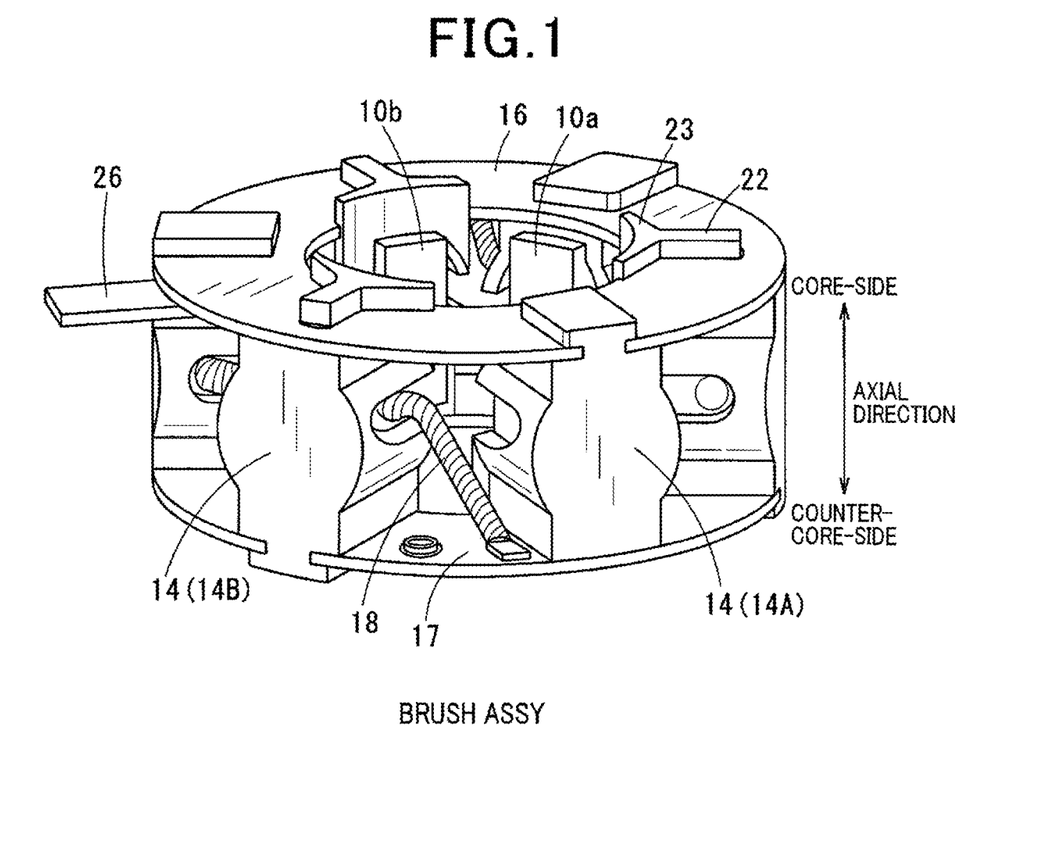
FIG. 1 shows a perspective view of a brush ASSY (assembly) according to a first embodiment.

The outside positions in the radial direction of the first brush holders 14A relative to the counter-core-side connection plate 17 are regulated by the arcuate radial direction position regulating portions 23 formed on the counter-core side being abut to the inner peripheral edge of the counter-core-side connection plate 17, which functions as a first regulating member (refer to FIG. 1).

Similarly, the outside positions in the radial direction of the second brush holders 14B relative to the core-side connection plate 16 are regulated by the arcuate radial direction position regulating portions 23 formed on the core side being abut to the inner peripheral edge of the core-side connection plate 16, which functions as a second regulating member.

The core-side connection plate 16 of the brush assembly is electrically connected to an M terminal bolt 27 (refer to FIG. 4) of the electromagnetic switch 5 via a conductive lead member 26, and the counter-core-side connection plate 17 of the brush assembly is electrically connected to an end frame 28 (a motor casing) of the motor 2 that forms a part of a ground circuit by being fixed to the end frame 28a by a bolt 29.

Note that the core-side connection plate 16 and the counter-core-side connection plate 17 are disposed in line in the axial direction without being electrically contacted with each other sandwiching the first brush holders 14A and the second brush holders 14B composed of insulating materials.

[Functions and Effects of the First Embodiment]

1) The brush assembly described in the first embodiment is capable of assembling the first brush holders 14A from the outer peripheral side of the core-side connection plate 16, and similarly, is capable of assembling the second brush holders 14B from the outer peripheral side of the counter-core-side connection plate 17.

Therefore, when assembling the first brush holders 14A and the second brush holders 14B, it is possible to prevent the positive brushes 10a and the negative brushes 10b from dropping out, using the jig 25 that is disposed at the central position in the radial direction, thus assemblability can be improved.

2) After assembling the first brush holders 14A on the core-side connection plate 16, the outside positions of the brush holders 14A in the radial direction are regulated by press-fitting the convex portions 22 of the first brush holders 14A into the second slits 17b of the counter-core-side connection plate 17.

Similarly, after assembling the second brush holders 14B on the counter-core-side connection plate 17, the positions of the second brush holders 14B outside in the radial direction are regulated by press-fitting the convex portions 22 of the second brush holders 14B into the second slits 16b of the core-side connection plate 16.

By adopting this press-fitting structure, fixing of the first brush holders 14A and the counter-core-side connection plate 17, and fixing of the second brush holders 14B and the core-side connection plate 16 become easy.

Moreover, since it is not necessary to use a separate part in order to regulate the positions of the first brush holders 14A and the second brush holders 14B outside in the radial direction, number of parts does not increase.

As a result, when assembling the brush assembly, it is easy to work and it is possible to reduce the labor required for the work, thus the productivity improves.

3) Since the first brush holders 14A are assembled from the outer peripheral side of the core-side connection plate 16, the first brush holders 14A can be assembled on the core-side connection plate 16 without interfering from each other, even when the three first brush holders 14A are assembled at the same time, for example.

Similarly, since the second brush holders 14B are assembled from the outer peripheral side of the counter-core-side connection plate 17, the second brush holders 14B can be assembled on the counter-core side connection plate 17 without interfering to each other, even when the three second brush holders 14B are assembled at the same time, for example.

Therefore, it is possible to shorten the assembly process by assembling the three first brush holders 14A and the three second brush holders 14B simultaneously.

Other embodiments of the present disclosure will be described in the following.

Note that components and compositions showing the common to those of the first embodiment, detailed description thereof will be omitted by assigning the same reference numerals as in the first embodiment.

Second Embodiment

The second embodiment is a case where assembling structures of the first brush holders 14A to the counter-core-side connection plate 17 and the second brush holders 14B to the core-side connection plate 16 are different from the press-fitting assembling structure as described in first embodiment (the structure of press-fitting the convex portions 22 into the second slits 16b, 17b).

Figure 7:
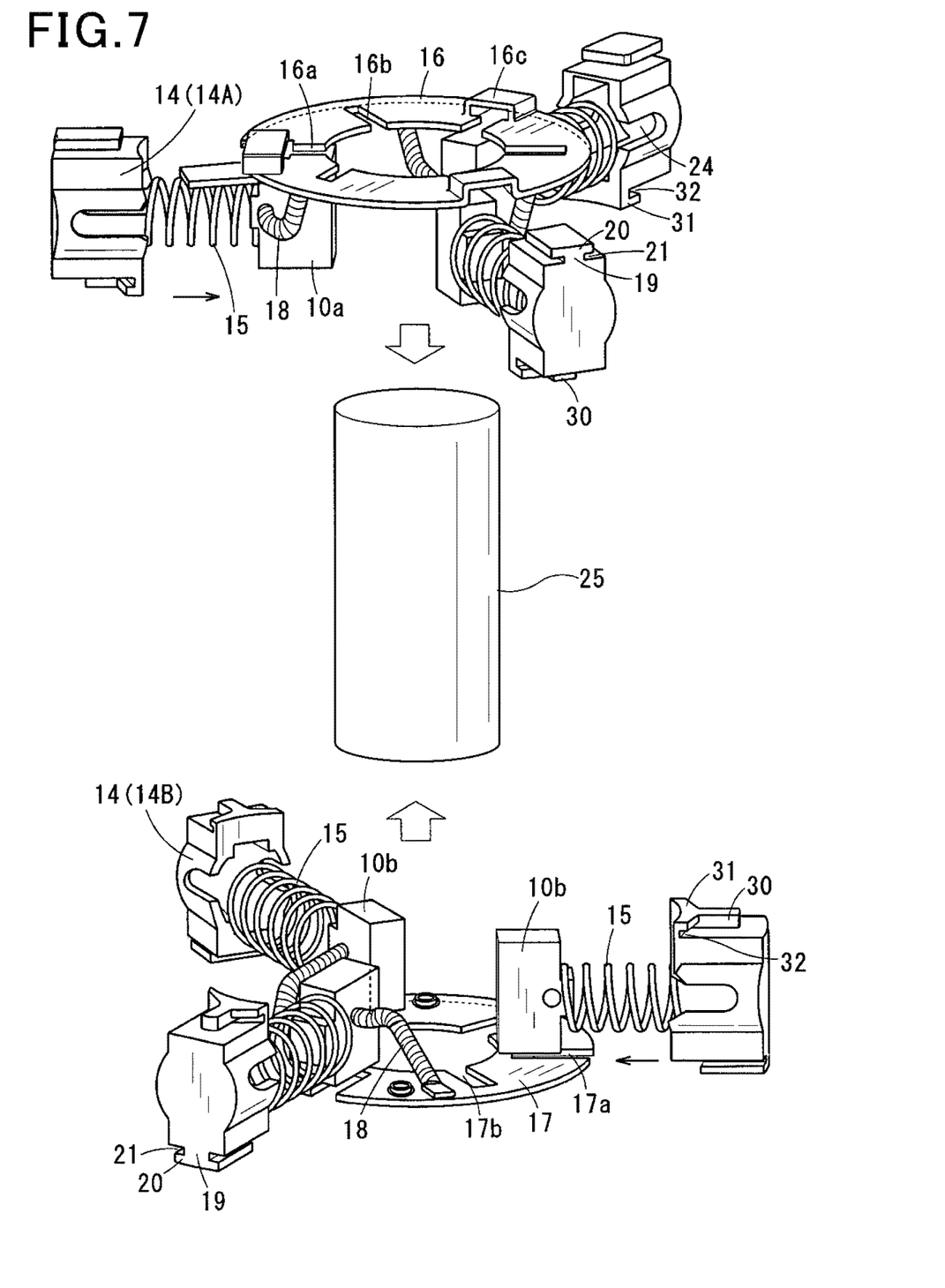
FIG. 7 shows a perspective view of a core-side sub ASSY and a counter-core-side sub ASSY in a state before assembling according to the second embodiment.

As shown in FIG. 7, the first brush holders 14A include second slit insertion portions 30 and position regulating portions 31 on counter-core sides thereof.

The second slit insertion portions 30 have convex shapes that can be inserted into the second slits 17b from the inner peripheral side of the counter-core-side connection plate 17.

The position regulating portions 31 have functions of regulating the axial positions and the outer radial positions of the first brush holders 14A relative to the counter-core-side connection plate 17.

The position regulating portions 31 are disposed inside in the radial direction of the second slit insertion portions 30, and fitting grooves 32 that open toward the outside in the radial direction are formed thereon.

The second brush holders 14B include second slit insertions portion 30 and position regulating portions 31 on the core side thereof, and have similar functions to the second slit insertion portions 30 and the position regulating portions 31 disposed in the first brush holders 14A.

Figure 6:
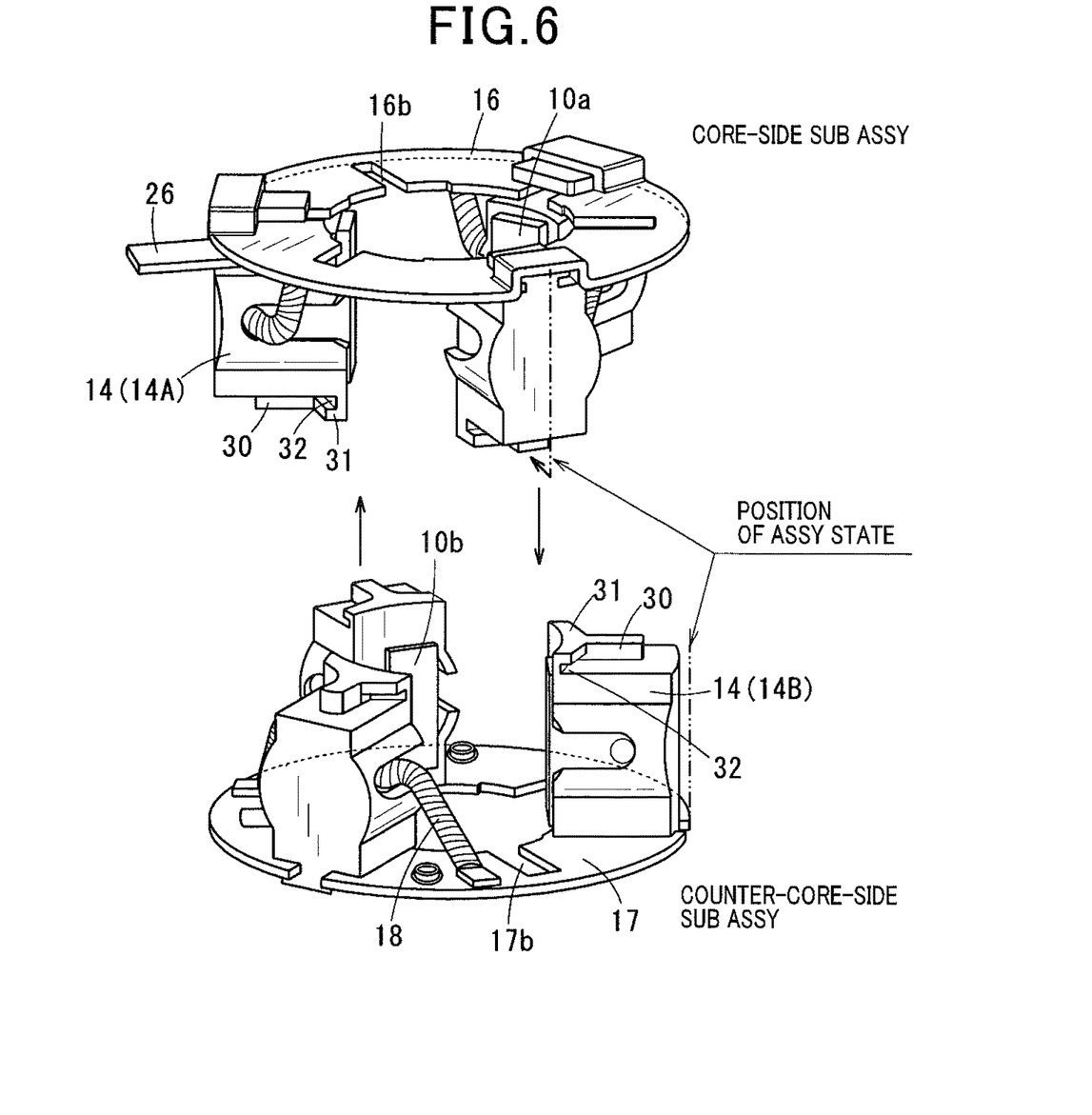
FIG. 6 shows a perspective view of the brush ASSY in a state before assembling according to the second embodiment.

As shown in FIG. 6, when inserting the slit insertion portions 19 into the first slits 16a of the core-side connection plate 16, the first brush holder 14A can be assembled slidably further to the inner peripheral side from a position of an assembly state (a position shown by a two-dot chain line in FIG. 6).

Figure 5:
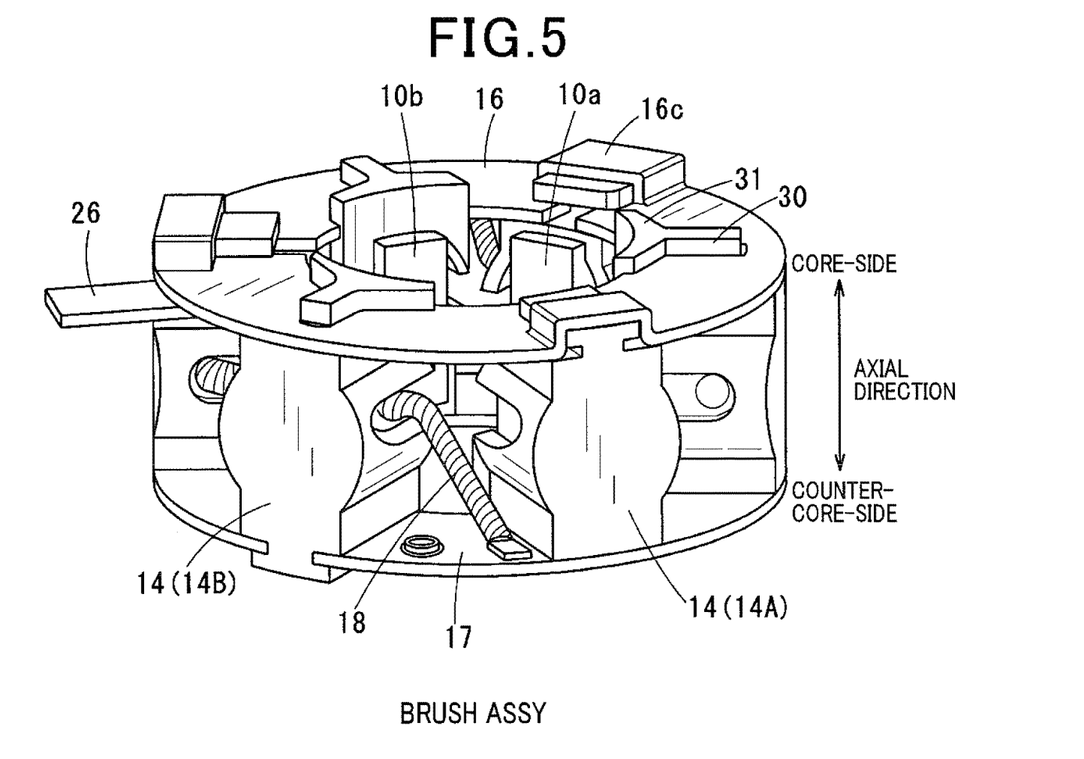
FIG. 5 shows a perspective view of a brush ASSY according to a second embodiment.

Note that the positions of the assembly state is a state where all the brush holders 14 in which the brush pressing members 15 and the brushes 10 are incorporated are assembled to the core-side connection plate 16 and the counter-core-side connection plate 17, i.e., the position of the brush holders 14 outside in the radial direction in a state of the brush assembly shown in FIG. 5.

The first slit 16a of the core-side connection plate 16 is formed longer than that of the first embodiment so that the first brush holder 14A can slide further toward the inner peripheral side than in the positions of the assembly state.

Alternatively, as shown in FIG. 7, the first slit 16a is formed across the core-side connection plate 16 from the outer periphery to the inner periphery thereof.

In this case, bridge portions 16c connecting flat portions formed on both sides of the first slits 16a in the circumferential direction with each other are disposed on a core side in a plate thickness direction of the core-side connection plate 16a (a side opposite to the side where the first brush holders 14A are disposed).

The bridge portions 16c are formed across the first slits 16a like tunnels so that the bridge portions 16c do not interfere with the slit insertion portions 19 and the supporting portions 20 when inserting the slit insertion portions 19 of the first brush holders 14A into the first slits 16a.

Although the first slit 17a is not formed across the counter-core-side connection plate 17 from the outer periphery to the inner periphery, the first slit 17a is formed longer than that of the first embodiment so that the second brush holder 14B can slide further toward the inner peripheral side than in the positions of the assembly state.

Similarly to the first embodiment, the first brush holders 14A and the second brush holders 14B are assembled by placing the cylindrical jig 25 (refer to FIG. 7), which regulates inside positions in the radial direction of the positive brushes 10a and the negative brushes 10b, in the central portion in the radial direction of the sub-assemblies, and are assembled to the core-side connection plate 16 and the counter-core-side connection plate 17, respectively.

After inserting the slit insertion portions 19 into the first slits 16a from the outer peripheral side of the core-side connection plate 16 and sliding the first brush holders 14A further to the inner peripheral side from the positions of the assembly state, when returning to the positions of the assembly state, the second slit insertion portions 30 slide in the second slits 17b from the inner peripheral side to the outer peripheral side of the counter-core-side connection plate 16.

When the second slit insertion portions 30 slide in the second slits 17b from the inner peripheral side to the outer peripheral side, the inner peripheral side of the counter-core-side connection plate 17 fits to the fitting grooves 32 formed in the position regulating portions 31.

Thereby, the axial positions of the first brush holders 14A relative to the counter-core-side connection plate 17 are regulated.

In addition, the first brush holders 14A are regulated at the positions of the assembly state by the inner peripheral edge of the counter-core-side connection plate 17 fitted to the fitting grooves 32 abutting against the groove bottoms of the fitting grooves 32.

Alternatively, the first brush holder 14A may also be regulated at the positions of the assembly state by the outer peripheral edges of the second slit insertion portions 30 abutting against the outer peripheral edges of the second slits 17b.

Similar to the first brush holders 14A, after sliding the second brush holders 14B further to the inner peripheral side from the positions of the assembly state relative to the counter-core-side connection plate 17, when returning to the positions of the assembly state, the second slit insertion portions 30 slide in the second slits 16b from the inner peripheral side to the outer peripheral side of the core-side connection plate 16.

At this time, the axial positions of the second brush holders 14B relative to the core-side connection plate 16 are regulated by the inner peripheral side of the core-side connection plate 16 fitting to the fitting grooves 32 formed in the position regulating portions 31, and the second brush holders 14B are regulated at the positions of the assembly state by the inner peripheral edge of the core-side connection plate 16 fitted to the fitting grooves 32 abutting against the groove bottoms of the fitting grooves 32.

Even in the configuration of the second embodiment, since the outside positions in the radial direction of the first brush holders 14A are regulated by the counter-core-side connection plate 17 by assembling the first brush holders 14A from the outer peripheral side of the core-side connection plate 16, and the outside positions in the radial direction of the second brush holders 14B are regulated by the core-side connection plate 16 by assembling the second brush holders 14B from the outer peripheral side of the counter-core-side connection plate 17, it is possible to obtain the same effects as in the first embodiment.

Third Embodiment

A third embodiment is a first case of a motor 2 with an electromagnet field system.

Figure 8:
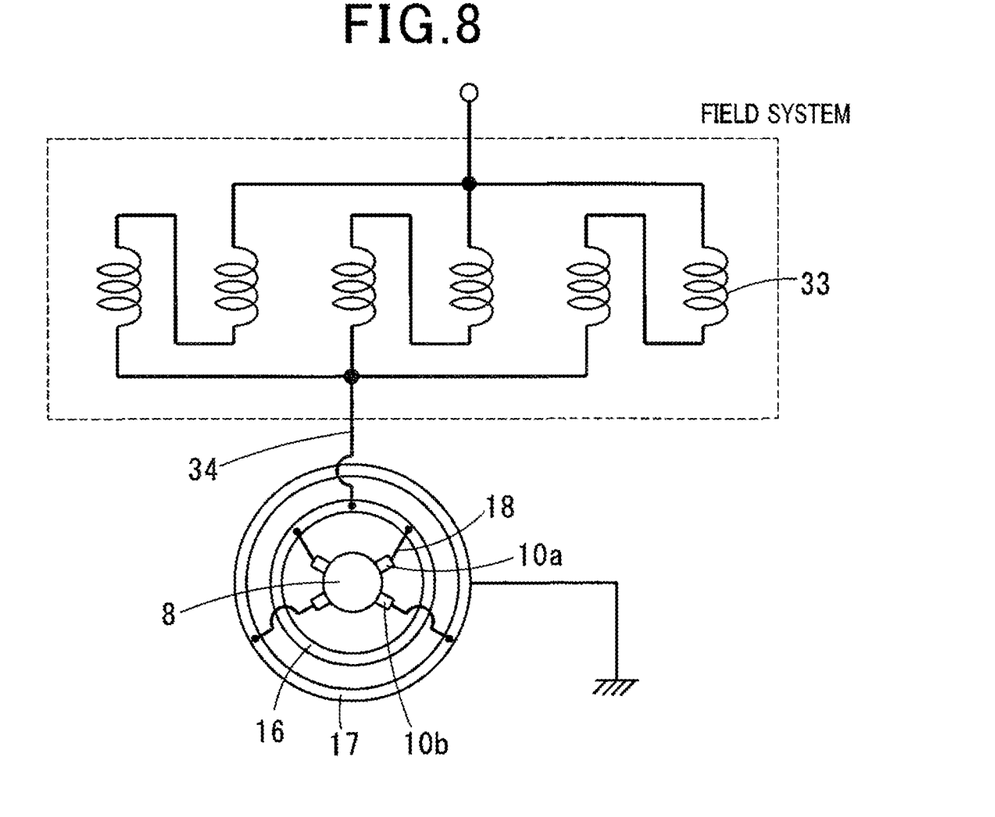
FIG. 8 shows a connection diagram of a motor according to a third embodiment.

As shown in FIG. 8, the motor 2 of the third embodiment includes a magnet field system for forming field poles by energizing field coils 33 and an armature 8 that has wave-wound armature coils 13, and is a series-wound type in which the field coils 33 are connected in series with the armature coils 13.

In addition, the motor 2 has a configuration that the number of the positive brushes 10a that are connected to the core-side connection plate 16 via the pigtails 18 is less than a half the number of the field poles (two in FIG. 8), and the field coils 33 and the core-side connection plate 16 are electrically connected via a single lead wire 34.

In the above configuration, it is possible to easily make a connection even if the number of ends of the field coils 33 that are connected to the core-side connection plate 16 and the number of the positive brushes 10a are different.

For example, in the case of FIG. 8, the number of positive brushes 10a may be configured to two (or one) for a six-pole field magnet that has the field coils 33 connected into two-series and three-parallel.

It should be noted that although the case of the series-wound type motor 2 is shown in FIG. 8, it may be a double-winding type motor that connects the field coils 33 and the armature coils 13 in series and parallel.

Figure 9:
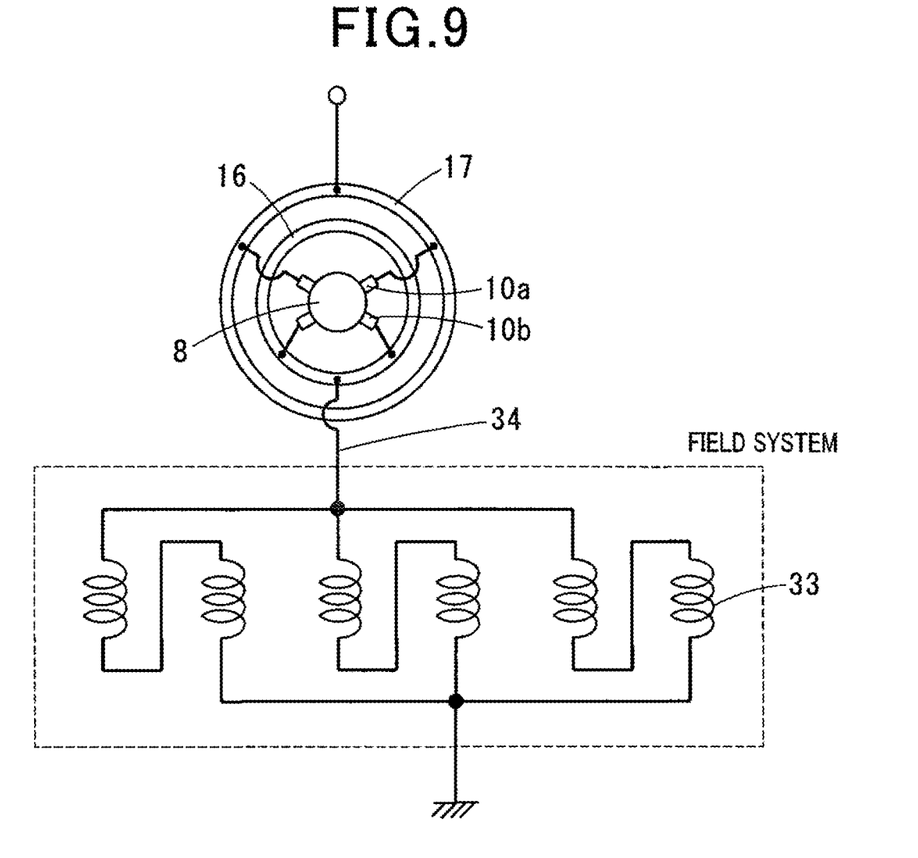
FIG. 9 shows another connection diagram of the motor according to the third embodiment.

Further, as shown in FIG. 9, it may be configured to connect the field coils 33 to a ground side with respect to the armature 8.

In this case, the negative brushes 10b are connected to the core-side connection plate 16, and the positive brushes 10a are connected to the counter-core-side connection plate 17.

Fourth Embodiment

A fourth embodiment is a second case of a motor 2 with an electromagnet field system.

The motor 2 of fourth embodiment has features that the field coils 33 of all the poles are connected in series or two parallel.

Figure 10:
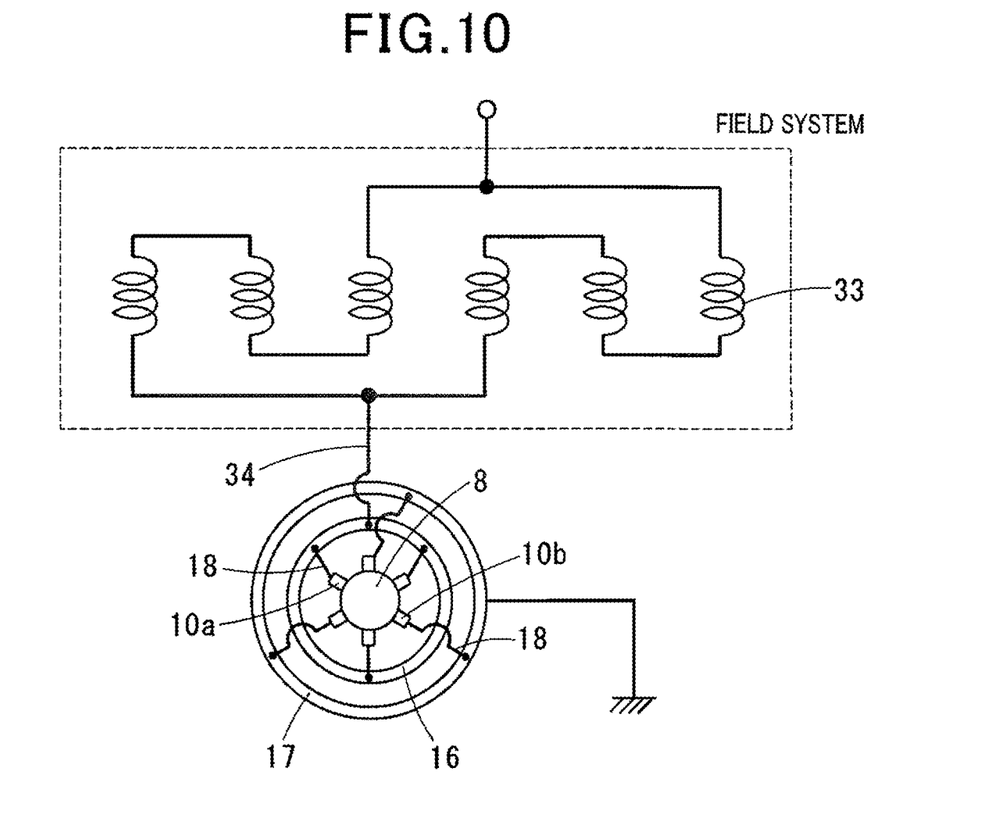
FIG. 10 shows a connection diagram of a motor according to a fourth embodiment.

An electromagnetic field shown in FIG. 10 is a case of 6 poles-3 series-2 parallel.

Figure 12:
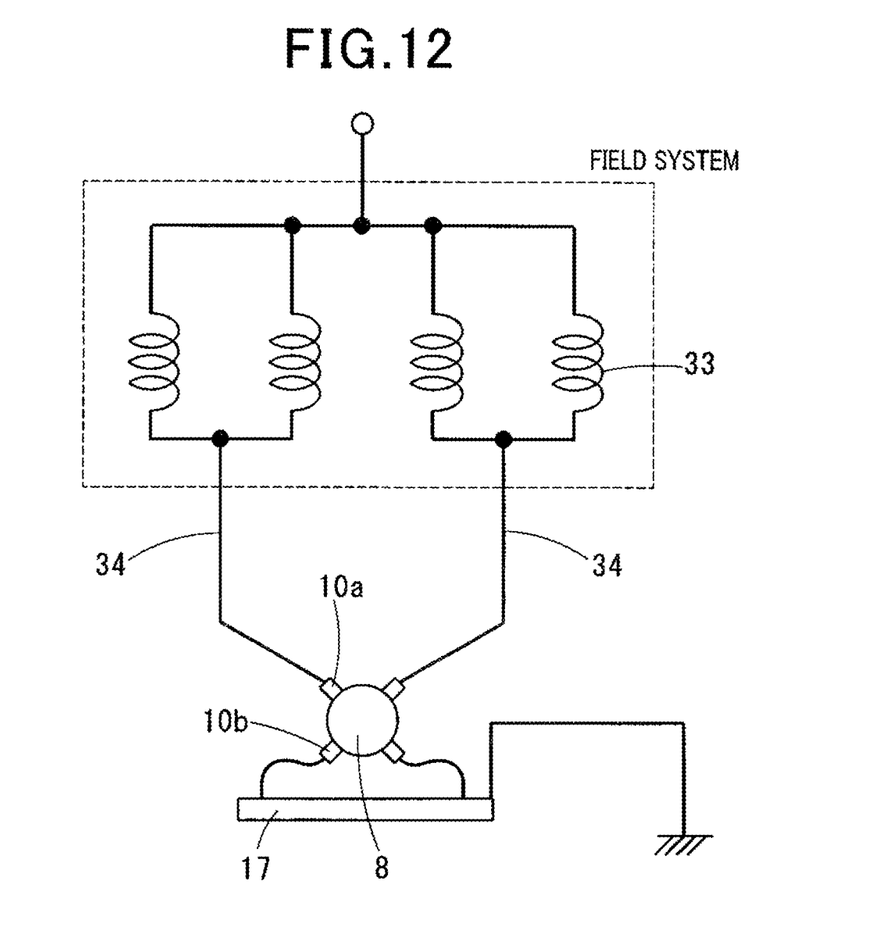
FIG. 12 shows a connection diagram of a typical DC motor having a magnet field system.

In the conventional DC motor with an electromagnetic field system, as shown in FIG. 12, each of the positive brushes 10a is connected to the field coils 33 via the lead wire 34, respectively.

Therefore, the numbers of lead wires 34 required are the numbers of positive brushes 10a (two in FIG. 12).

In contrast, in the motor 2 of the fourth embodiment, as shown in FIG. 10, regardless of the number of the positive brushes 10a, it is possible to connect the field coils 33 and the core-side connection plate 16 by a single lead wire 34, therefore a motor 2 with a minimum number of components that is low in cost can be realized.

Figure 11:
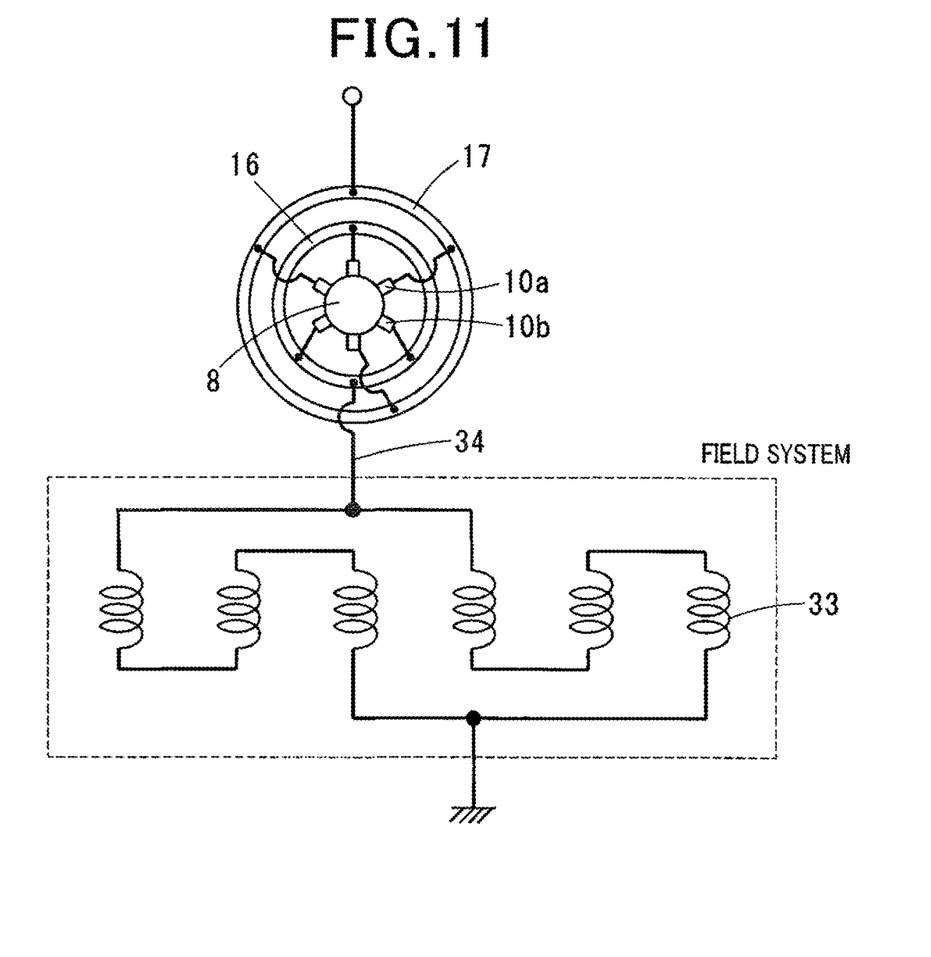
FIG. 11 shows another connection diagram of the motor according to the fourth embodiment.

As shown in FIG. 11, the motor 2 of the fourth embodiment may be configured to connect the field coils 33 to a ground side with respect to the armature 8.

In this case, the negative brushes 10b are connected to the core-side connection plate 16, and the positive brushes 10a are connected to the counter-core-side connection plate 17.

[Modifications]

Although the configuration where the positive brushes 10a are connected to the core-side connection plate 16 while the negative brushes 10b are connected to the counter-core-side connection plate 17 is described in the first and second embodiments, it may be configured to connect the positive brushes 10a to the counter-core-side connection plates 17 and the negative brushes 10b to the core-side connection plate 16.

Although the outside positions in the radial direction of the first brush holders 14A and the second brush holders 14B relative to the core-side connection plate 16 and the counter-core-side connection plate 17 are regulated by the arcuate radial regulating portions 23 in the first embodiment, it is also possible to regulate the outside positions by abutting ends of the convex portions 22 (ends in sides opposite to the radial direction regulating portions) to ends of the second slits 16b, 17b.

Although it is configured that the convex portions 22 of the first brush holders 14A are press-fit into the second slits 17b formed in the counter-core-side connection plate 17, and the convex portions 22 of the second brush holders 14B are press-fit into the second slits 16b formed in the core-side connection plate 16 in the first embodiment, either one of the core-side and the counter-core-side may employ the press-fitting configuration.

Although the bridge portions 16c that across the first slits 16a like the tunnels in the circumferential direction are disposed on the core side in the thickness direction with respect to the core-side connection plate 16 in the second embodiment, it is possible to dispose similar bridge portions 17c on the counter-core-side connection plate 17.

Alternatively, the tunnel-like bridge portions 17c may be disposed only on the counter-core-side connection plate 17.

In second embodiment, it has the configuration that after sliding the first brush holders 14A further to the inner peripheral side from the positions of the Assembled state relative to the core-side connection plate 16, when returning to the positions of the assembly state, the second slit insertion portions 30 are inserted into the second slits 17b in the counter-core-side connection plate 17 and the first brush holders 14A are assembled to the counter-core-side connection plate 17, and the second brush holders 14B have the same configuration.

However, optionally, only either ones of the first brush holders 14A and the second brush holders 14B may employ the above configuration (the configuration of returning to the positions of the assembly state after sliding further into the inner peripheral side from the positions of the Assembled state).

What is claimed is:

1. A brush device comprising:
  a positive side brush sub-assembly having a positive side brush for feeding a commutator, a positive side brush holder for holding the positive side brush, and a positive side plate to which the positive side brush holder is attached, and
  a negative side brush sub-assembly having a negative side brush for feeding the commutator, a negative side brush holder for holding the negative side brush, and a negative side plate to which the negative side brush holder is attached, wherein
  the positive side brush holder has a positive convex portion engaging with the negative side plate,
  the negative side brush holder has a negative convex portion engaging with the positive side plate,
  the positive side plate has a positive slit engaging with the negative convex portion,
  the negative side plate has a negative slit engaging with the positive convex portion, and
  the positive side brush sub-assembly and the negative side brush sub-assembly are combined with each other by the positive convex portion and the negative slit being engaged and the negative convex portion and the positive slit being engaged.

2. The brush device according to claim 1, wherein
  the positive side brush holder is attached to one surface of the positive side plate,
  the negative side brush holder is attached to one surface of the negative side plate, and
  the one surface of the positive side plate and the one surface of the negative side plate face each other when the positive side brush sub-assembly and the negative side brush sub-assembly are combined with each other.

3. The brush device according to claim 2, wherein
  the positive side plate and the negative side plate are conductive, and
  the one surface of the positive side plate and the one surface of the negative side plate are disposed in parallel with each other in an axial direction with the positive side brush holder and the negative side brush holder formed of insulating members between the positive side plate and the negative side plate without being electrically contacted with each other.

4. A brush device comprising:
  a positive side brush sub-assembly having a positive side brush for feeding a commutator, a positive side brush holder for holding the positive side brush, and a positive side plate to one surface of which the positive side brush holder is attached; and
  a negative side brush sub-assembly having a negative side brush for feeding the commutator, a negative side brush holder for holding the negative side brush, and a negative side plate to one surface of which the negative side brush holder is attached, wherein the positive side brush sub-assembly and the negative side brush sub-assembly are combined with each other so that the one surface of the positive side plate and the one surface of the negative side plate face each other, flat plate portions are provided between a plurality of slits aligned in a circumferential direction of the positive side plate, and positive side connecting flat plate portions connecting pigtails of the positive side brushes and positive side non-connecting flat plate portions not connecting the pigtails are disposed alternately on the flat plate portions, other flat plate portions are provided between a plurality of slits aligned in the circumferential direction of the negative side plate, and negative side connecting flat plate portions connecting pigtails of the negative side brushes and negative side non-connecting flat plate portions not connecting the pigtails are disposed alternately on the other flat plate portions, and the positive side connecting flat plate portions and the negative side non-connecting flat plate portions are assembled facing each other in the axial direction, and the positive side non-connecting flat plate portions and the negative side connecting flat plate portions are assembled facing each other in the axial direction.

5. An electric motor with a brush device, the brush device comprising:

a positive side brush sub-assembly having a positive side brush for feeding a commutator, a positive side brush holder for holding the positive side brush, and a positive side plate to which the positive side brush holder is attached, and a negative side brush sub-assembly having a negative side brush for feeding the commutator, a negative side brush holder for holding the negative side brush, and a negative side plate to which the negative side brush holder is attached, wherein the positive side brush holder has a positive convex portion engaging with the negative side plate, the negative side brush holder has a negative convex portion engaging with the positive side plate, the positive side plate has a positive slit engaging with the negative convex portion, the negative side plate has a negative slit engaging with the positive convex portion, and the positive side brush sub-assembly and the negative side brush sub-assembly are combined with each other by the positive convex portion and the negative slit being engaged and the negative convex portion and the positive slit being engaged.

\* \* \* \* \*